(12) United States Patent
Limpert

(10) Patent No.: US 12,398,746 B2
(45) Date of Patent: Aug. 26, 2025

(54) FASTENING MODULE, METHOD FOR PRODUCING A FASTENING MODULE, AND METHOD FOR CONNECTING TWO COMPONENTS TO A FASTENING MODULE

(71) Applicant: ILLINOIS TOOL WORKS INC., Glenview, IL (US)

(72) Inventor: Alexander Limpert, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 248 days.

(21) Appl. No.: 17/718,650

(22) Filed: Apr. 12, 2022

(65) Prior Publication Data
US 2022/0325743 A1    Oct. 13, 2022

(30) Foreign Application Priority Data

Apr. 13, 2021    (DE) ............. 10 2021 109 162.4
Mar. 30, 2022    (DE) ............. 10 2022 107 606.7

(51) Int. Cl.
*F16B 21/02*    (2006.01)
*F16B 37/04*    (2006.01)

(52) U.S. Cl.
CPC ............ *F16B 37/042* (2013.01); *F16B 21/02* (2013.01); *F16B 37/044* (2013.01)

(58) Field of Classification Search
CPC ...... F16B 37/04; F16B 37/042; F16B 37/045; F16B 37/044; F16B 13/0808; F16B 21/02
USPC .......... 411/340, 344, 551, 307, 533
See application file for complete search history.

(56) References Cited

U.S. PATENT DOCUMENTS

| | | | | |
|---|---|---|---|---|
| 2,385,180 A | * | 9/1945 | Allen | F16B 5/10 411/551 |
| 2,390,325 A | * | 12/1945 | Rapp | F16B 5/02 411/366.1 |
| 2,403,247 A | * | 7/1946 | Sullivan | F16B 5/02 411/340 |
| 2,486,670 A | * | 11/1949 | Nigg | F16B 5/10 411/533 |
| 4,854,794 A | * | 8/1989 | Oertel | F16B 39/30 411/393 |
| 4,907,927 A | * | 3/1990 | Choiniere | F16B 43/00 411/533 |
| 5,082,412 A | * | 1/1992 | Thomas | F16B 43/001 411/533 |
| 7,524,154 B2 | * | 4/2009 | LaConte | F16B 5/02 411/372.6 |
| 7,621,707 B2 | * | 11/2009 | Sbongk | F16B 37/042 411/182 |
| 8,807,900 B2 | * | 8/2014 | Ramsauer | E05B 9/084 411/347 |

(Continued)

FOREIGN PATENT DOCUMENTS

AT    200395 B    5/1998
DE    3248696 A1    7/1984
(Continued)

*Primary Examiner* — Flemming Saether
(74) *Attorney, Agent, or Firm* — THOMPSON HINE LLP

(57) ABSTRACT

A fastening module, in particular for connecting two components, is provided. The module includes a housing device that defines a receiving space, a nut device that is arranged so as to be displaceable in the receiving space, and a screw device that is connected to the housing device in such a way that the fastening module is a pre-assembled module.

10 Claims, 3 Drawing Sheets

(56) References Cited

U.S. PATENT DOCUMENTS

| | | | | |
|---|---|---|---|---|
| 10,266,994 | B2* | 4/2019 | McDowell | F16B 5/0642 |
| 10,848,844 | B2* | 11/2020 | Brousseau | H04R 1/026 |
| 11,788,572 | B2* | 10/2023 | Limpert | F16B 37/042 |
| | | | | 29/525.02 |
| 2012/0308328 | A1* | 12/2012 | Ueno | F24S 25/636 |
| | | | | 411/134 |
| 2016/0363153 | A1* | 12/2016 | Lakoduk | F16B 37/044 |
| 2022/0364589 | A1* | 11/2022 | Frisch | F16B 37/042 |

FOREIGN PATENT DOCUMENTS

| | | |
|---|---|---|
| DE | 102005032699 A1 | 1/2007 |
| DE | 102017128842 A1 | 6/2019 |
| EP | 0681110 A1 | 11/1995 |
| FR | 2613439 A1 | 10/1988 |
| WO | WO 2016/200963 A1 | 12/2016 |

\* cited by examiner

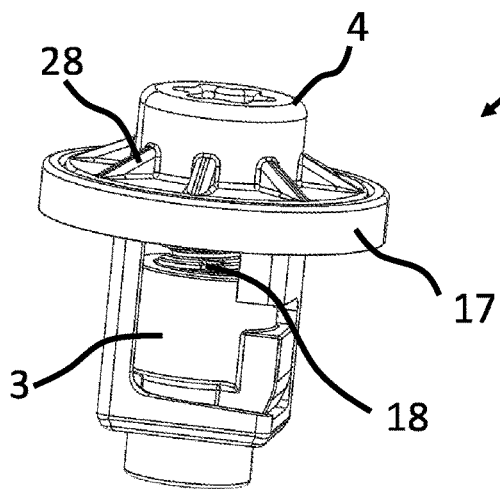
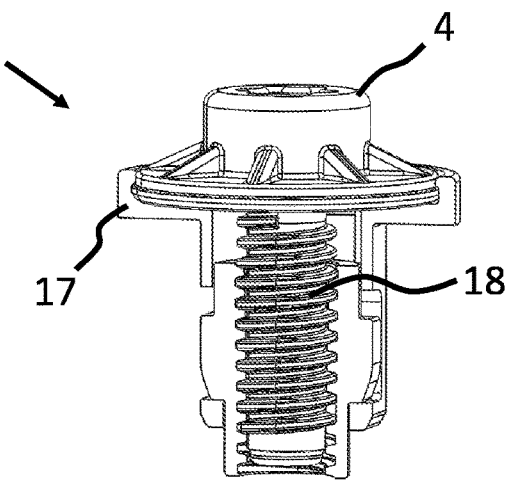
Fig. 5
Fig. 6
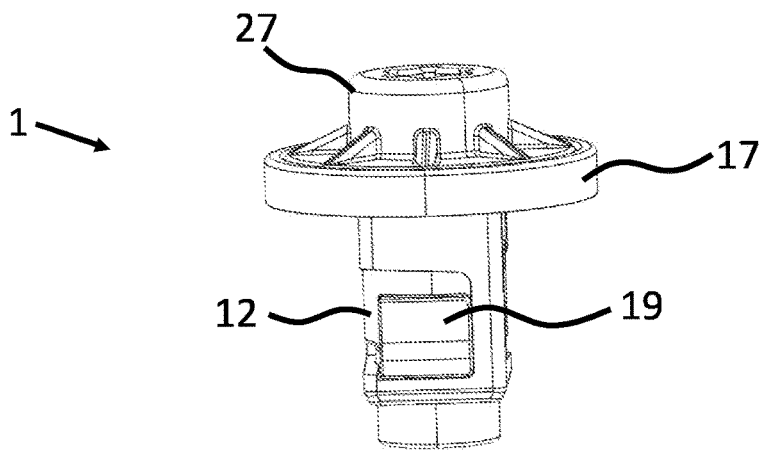
Fig. 7
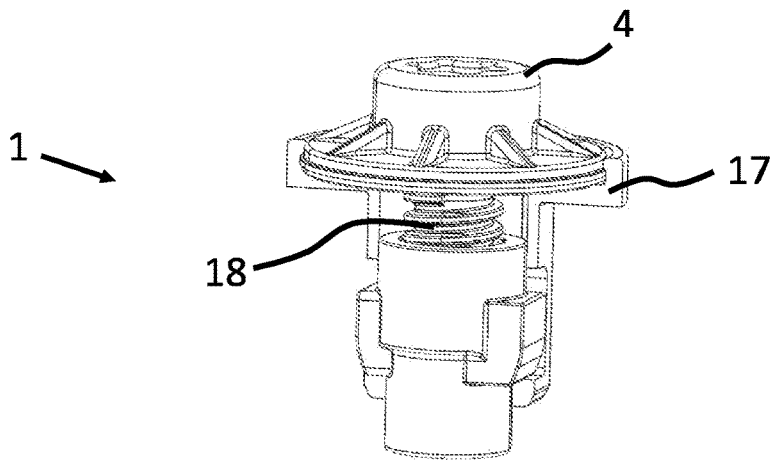
Fig. 8

FASTENING MODULE, METHOD FOR PRODUCING A FASTENING MODULE, AND METHOD FOR CONNECTING TWO COMPONENTS TO A FASTENING MODULE

TECHNICAL FIELD

The present invention relates to a fastening module, a method for producing a fastening module, and a method for connecting two components to a fastening module.

BACKGROUND

Connecting means for connecting a first component to a second component are disclosed in EP 0 681 110 B1 and in DE 10 2005 032 699 B4.

DE 10 2017 128 842 A1 also discloses connecting means for application in connections within a motor vehicle.

One problem of the present invention is to provide a fastening module that offers an alternative to the connecting means for connecting two components that are known from the prior art.

A further problem of the present invention is to provide a fastening module that is secure and reliable in operation.

In addition, a problem of the present invention is to form a simply constructed fastening module with which two plate-shaped components can be connected to one another.

A further object of the present invention is to provide a method for producing such a module as well as a method for connecting two components by means of such a fastening module.

One or more of these problems are solved by the features of independent claims. Advantageous configurations are specified in the respective dependent subclaims.

SUMMARY

According to the invention, a fastening module, in particular for connecting two components, is provided. Said module comprises a housing device that defines a receiving space, a nut device that is arranged so as to be displaceable in the receiving space, and a screw device that is connected to the housing device in such a way that the fastening module is a pre-assembled module.

Preferably, an external thread of the screw device is engaged with an internal thread of the nut device.

The inventors of the present invention have recognized that fastening means known in the prior art are disadvantageous in that a user must manually screw a screw into a corresponding nut of the connecting means on site in order to use the connecting means.

In doing so, the user can apply too much pressure to the nut in a direction of assembly by means of the screw, such that the nut is pushed out of a corresponding housing or damaged. A corresponding nut then usually falls into a cavity of a vehicle or the like and is difficult to retrieve. In addition, the connecting means is then damaged and can no longer be used.

In particular, because the screw device is already pre-assembled, it does not have to be acted upon by any force acting in the direction of assembly during the assembly of the fastening module. In this way, a loss of the nut device, e.g. a push-through, and damage to the fastening module are prevented. This saves time and reduces costs.

With the fastening module according to the invention, such a pre-assembled connecting means for connecting two components as a module is formed for the first time.

In that the nut device is arranged in the housing device and a screw device is connected to the housing device, a pre-assembled module is provided.

This pre-assembled module can be delivered directly to the customer, and a user must merely insert the module in an axial direction or a direction of assembly in passages of two components to be connected and apply a torque to the screw device in order to connect the two components to each other.

In this way, two plate-shaped components can be securely and reliably connected to one another with the fastening group.

Further, such a fastening module can also provide an alternative to non-detachable connecting means for connecting two plate-shaped components, such as rivets. This has the advantage that the fastening module according to the invention can be disassembled without damage and can be used again accordingly.

The connection between the screw device and the housing device can be configured as a sliding bearing, wherein a screw head of the screw device is rotatably mounted and received in a screw head receiving region of the housing device, and wherein the screw device is fixedly placed in the axial direction by the mounting of the screw head in the screw head receiving region.

In particular, due to the fact that a screw head of the screw device is rotatably mounted and received in a screw head receiving region of the housing device, wherein the screw device is fixedly placed in the axial direction by the mounting of the screw head in the screw head receiving region, an incorrect usage by the user is effectively prevented. This relates, for example, to the application of a force that has too large of an effect in an axial direction or direction of assembly when screwing a separate screw into a nut of a corresponding connecting means.

Thus, the screw does not have to be displaced or moved in the axial direction for connecting two components, neither during pre-assembly nor during final assembly. In this case, it is merely sufficient to apply a torque to the screw head of the screw device and to set the screw device into rotational movement, whereby the nut device is merely displaced axially counter to a direction of assembly.

In the context of the present invention, a direction of assembly is understood to mean a direction that is orthogonal to a surface of a first of two components to be connected to one another, in which the housing device of the fastening module is inserted in two passages of the two plate-shaped components, said passages being arranged in alignment with one another. This direction also corresponds to the axial direction of the apparatus.

Furthermore, a slope of an external thread of the screw device and a slope of an internal thread of the nut device can at least slightly differ from one another, such that a self-inhibition between the threads is present upon transfer of a torque from the screw device to the nut device. Thus, the external thread of the screw device and the internal thread of the nut device can have a different slope, wherein the two slopes differ only to the extent that a screwing of both threads is possible.

In this way, a secure and reliable movement of the nut device in the receiving space of the housing device is ensured. In addition, there is a controlled connection of the two components to one another.

The nut device can comprise one and preferably two retaining elements extending radially outward, wherein two plate-shaped components can be fixed between the retaining elements and the screw head receiving region in a final assembly position.

By means of two preferably diametrically opposed retaining elements extending radially outwardly, wherein corresponding retaining surfaces of the retaining elements can be arranged orthogonally or perpendicular to the direction of assembly or the axial direction, a secure and reliable connection of two components to one another can be brought about.

The housing device can be approximately rectangular in cross-section and can have a bottom wall, which can be connected to the screw head receiving region via two struts that are diametrically opposed to one another. In the region of the bottom wall, a pre-assembly receiving region for receiving the retaining elements in a pre-assembly position can be provided, being configured in such a way that, when a torque is applied to the screw device, the nut device can be axially displaced in the pre-assembly receiving region. After a predetermined displacement in the axial direction, the nut device can be rotatable into an assembly region of the receiving space, and the nut device can be axially displaceable in the assembly region until a final assembly position is achieved.

In addition, the screw head receiving region in the region of the screw head can comprise a radially circumferential groove with a preferably semi-circular cross-section, which can extend in particular orthogonally to the axial direction, wherein a radial outer edge of the screw head rotatably supported therein is configured correspondingly.

In this case, it can be provided that the radial outer edge of the screw head is arranged at a slight distance from the radially circumferential groove of the screw head receiving region.

The pre-assembly receiving region can be configured on one side of the housing device in the region of the receiving space, and the assembly region can be configured on a side of the receiving space adjacent to the former side.

The pre-assembly receiving region is arranged in front in the direction of assembly and is configured to be approximately rectangular, so that a section of the side wall remains in the corresponding side wall at the opposite end of the direction of assembly.

The assembly region is rectangular in shape and extends substantially over the entire side wall.

The pre-assembly region and the assembly region therefore each form one leg of an L shaped passage in two adjacent side walls.

A side of the housing device is understood to mean a side wall of the housing device, wherein the side wall is not configured as a continuous wall, but rather can comprise corresponding recesses for the retaining elements.

Furthermore, according to the present invention, a method for producing a fastening module as explained above is provided. This method includes the following steps:
producing a housing device, preferably by injection molding,
producing a nut device, preferably by injection molding,
producing a screw device, preferably by injection molding,
inserting the nut device into a receiving region of the housing device and screwing the screw device into the nut device until a screw head of the screw device is rotatably received in a screw head receiving region of the housing device in such a way that a connection between the screw device and the housing device forms a sliding bearing, wherein the screw head is fixedly placed in the axial direction in the screw head receiving region.

Such a method can preferably be carried out at least partially and preferably entirely in a production plant. In this way, the fastening module can be produced in a fully automated manner and can be used directly without further post-processing and/or assembly steps.

It can be provided, in particular, that the screw device is screwed into the nut in the axial direction to a defined extent or to a predetermined length or predetermined angle of rotation. Then, the screw device and the nut device can be inserted or stuck together from above or via the first screw passage in the axial direction into the housing device until a screw jack in the screw head receiving region of the housing device clicks into place.

The screw device can then be rotated counterclockwise so that the nut device rotates 90° and touches or abuts against a stop surface. The screw device can then be continuously rotated to a defined extent or a predetermined length or a predetermined angle of rotation until a final pre-assembly position of the nut device is achieved and the nut device is arranged or retained in a pre-assembly receiving region.

The pre-assembly process is now complete, and the component is operational and, for example, can be sent as a module to a customer without changing a relative position of the individual components.

In addition, according to the present invention, a method for connecting two components to a fastening module as explained above is provided. This method includes the following steps:
preferably, inserting a tool into a drive of a screw device of the fastening module,
inserting the fastening module, in particular a housing device of the fastening module, into two through-openings of two components to be connected, said openings being arranged in alignment with one another,
applying a torque to a screw head of the screw device in such a way that the screw head is set into a rotational movement and remains fixed in an axial direction in a screw head receiving region of the housing device, wherein a nut device of the fastening module is first displaced in the axial direction and then transferred from a pre-assembly position into an assembly position by a rotational movement about a longitudinal screw axis, wherein the nut device in the assembly position is then moved in the axial direction until a final assembly position is achieved, in which at least one retaining element of the nut device fixes the two components to be connected between the screw head receiving region of the housing device and the retaining element.

The advantages of the method correspond analogously to the advantages demonstrated by the fastening module.

BRIEF DESCRIPTION OF THE DRAWINGS

The invention will be described in more detail in the following on the basis of an exemplary embodiment shown in the figures. The figures show.

DETAILED DESCRIPTION

Figure 1:
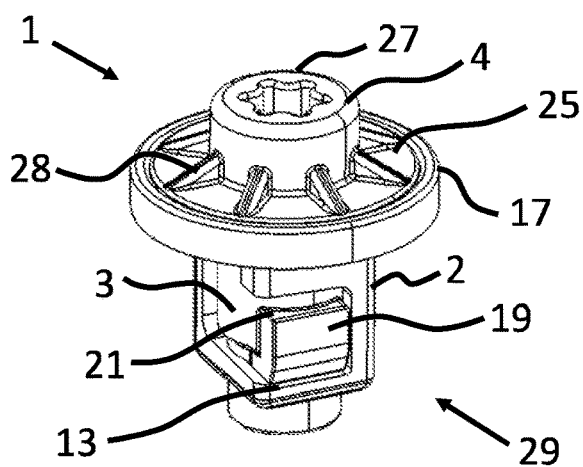
FIG. 1 a perspective view of a fastening module with a nut device in a pre-assembly position, FIG. 2 a perspective view of the fastening module with the nut device upon transfer from a pre-assembly position into an assembly position, FIG. 3 a perspective view of the fastening module with the nut device in an assembly position, FIG. 4 a perspective view of the fastening module, two components to be connected to one another, and the nut device in a final assembly position, FIG. 5 a further perspective view of the fastening module, FIG. 6 a side-cut view of the fastening module, FIG. 7 a further perspective view of the fastening module, FIG. 8 a partially cut detail view of the fastening module, FIG. 9 a further perspective view of the fastening module, FIG. 10 a further perspective view of the fastening module, FIG. 11 a further perspective view of the fastening module, and FIG. 12 a further perspective view of the fastening module with two components connecting to each other in a final assembly position.
Figure 2:
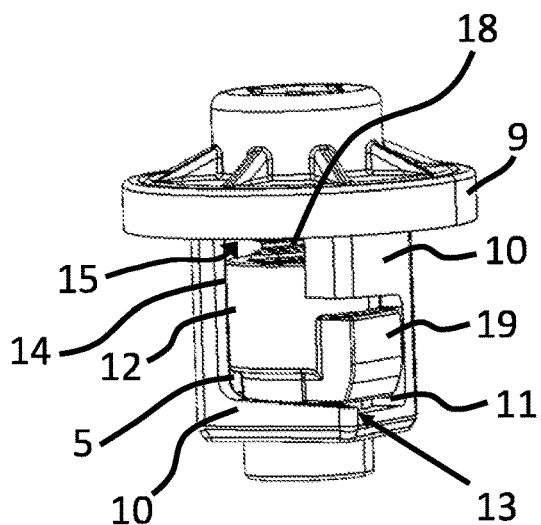
Figure 3:
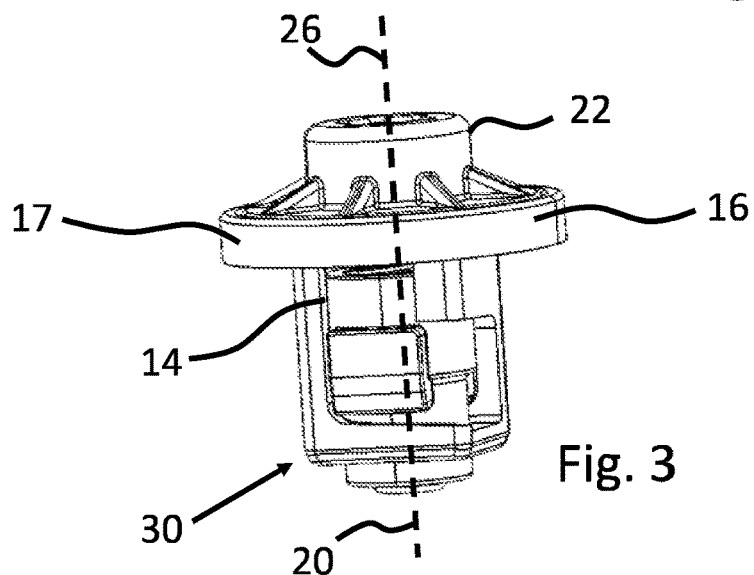
Figure 4:
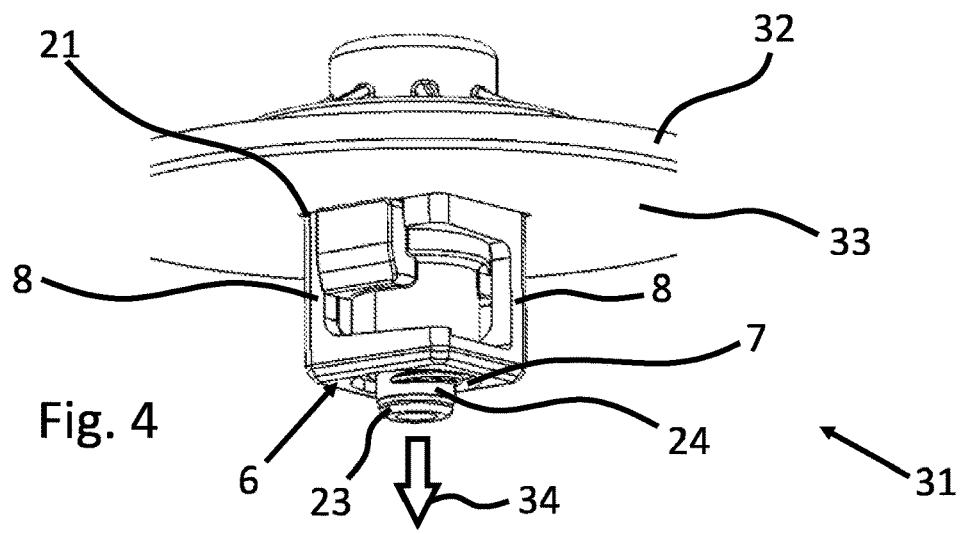
Figure 9:
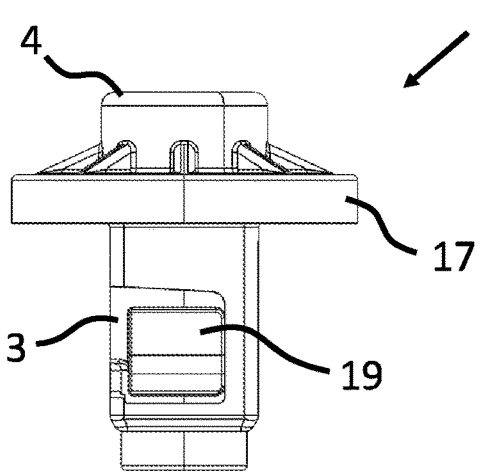
Figure 10:
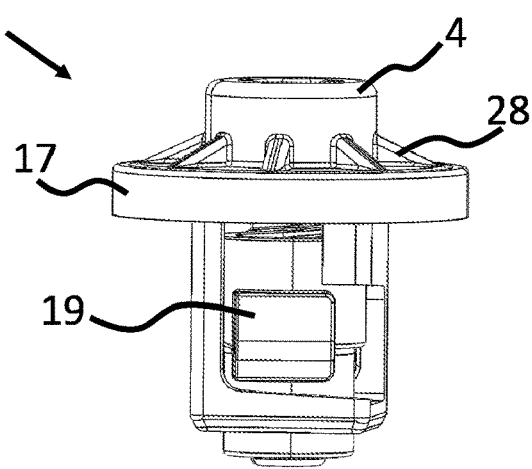
Figure 11:
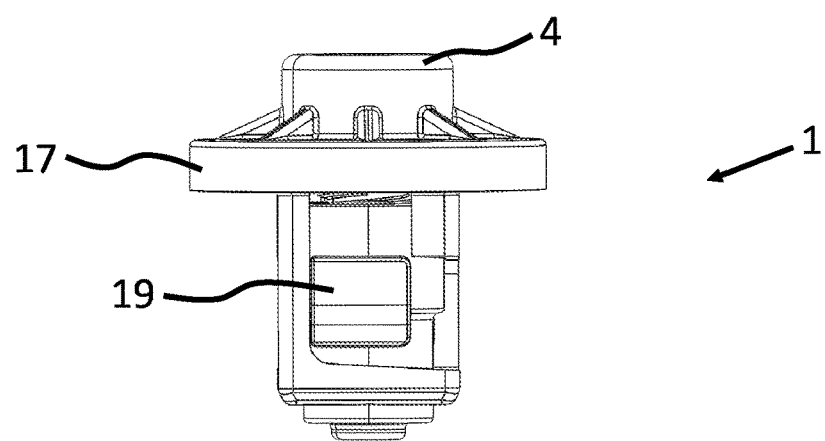
Figure 12:
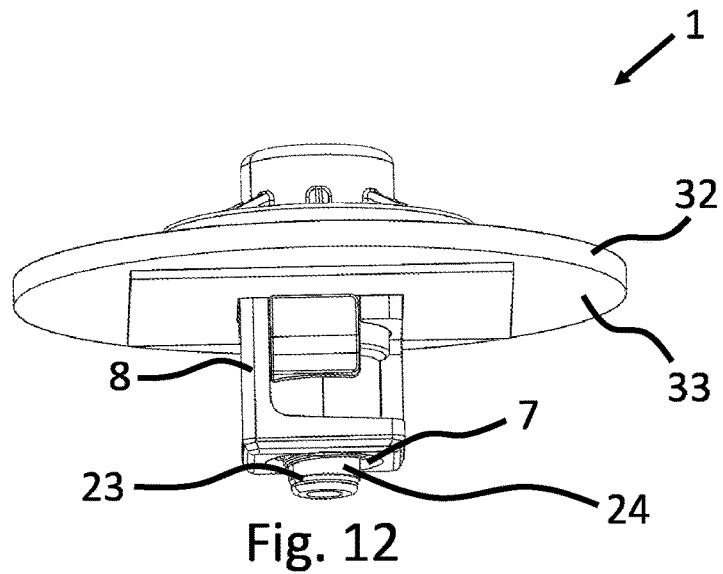

A fastening module 1 according to the invention comprises a housing device 2, a nut device 3, and a screw device 4 connected to the housing device (FIGS. 1 to 12).

The housing device 2 is configured to be approximately rectangular in cross-section. Furthermore, the housing device 2 defines a receiving space 5.

The housing device 2 comprises a bottom wall 6 with a first screw passage 7.

The bottom wall 6 is connected to a screw head receiving region 9 via two struts 8, which extend in the axial direction, are arranged in diametrical opposition to one another, and are integrally formed at corner edges of the bottom wall 6.

The housing device 2 comprises four side walls 10.

In two opposing side walls 10, a passage is provided in the region of the bottom wall, which respectively forms a pre-assembly receiving region 11.

In the two other side walls 10, which are arranged adjacent to the side walls 10 in which the pre-assembly receiving regions 11 are formed, an approximately rectangular passage is provided, which forms an assembly region 12.

The assembly region 12 extends approximately from the bottom wall 6 in the axial direction 20 until the screw head receiving region 9.

The pre-assembly receiving region 11 is connected to the assembly region 12 in such a way that an approximately L-shaped opening is formed in the side walls 10 of the housing device 2.

In the region in which the pre-assembly receiving region 11 is connected to the assembly region 12, a shoulder 13 extending in the axial direction is provided, which forms a first stop 13. The first stop extends in the axial direction 20 over a length of approximately 0.5 mm to 1.5 mm, and preferably of approximately 0.7 mm.

A second stop 14 extending in the axial direction is provided at a corner edge defining the assembly region 12, said second stop extending until the screw head receiving region 9.

The screw head receiving region 9 has an approximately circular disk shape and comprises a second screw passage 15, which opens into the receiving space 5.

The circular disk-shaped region of the screw head receiving region 9 is referred to as the axial stop 16. A mounting wall 17 extending in the axial direction is integrally formed in a radially circumferential manner on the circular disk-shaped axial stop 16. The mounting wall 17 is preferably configured to be semi-circular in cross-section, so that a groove is provided.

The nut device 3 is received and mounted in the receiving space 5. The nut device 3 is approximately circular in shape and is equipped with an internal thread 18.

Furthermore, two retaining elements 19 extending radially outward are integrally formed on the nut device. The retaining elements have retaining surfaces 21, which extend transversely or orthogonally to the axial direction 20.

The screw device 4 comprises a screw head 22 and a screw shank 23. An external thread 24 is formed on the screw shank.

The screw head 22 comprises a circular disk-shaped mounting section 25 via which the screw head 22 or the screw device 4 is received in the axial stop 16 and the mounting wall 17 of the pre-assembly receiving region 11 and rotatably mounted about a longitudinal axis 26. By mounting the screw head 22 in the screw head receiving region 9, the screw device 4 is fixed axially in place in the housing device 2.

At the circular disk-shaped mounting section 25, a drive 27 extending in the axial direction is integrally formed. The drive can be configured as a Torx drive, Allen drive, outer hex drive, Phillips drive, or cross drive.

The cylindrical drive 27 is connected to the mounting section 25 via stiffening struts 28.

In a pre-assembly position 29, the retaining elements 19 are arranged in the pre-assembly receiving region 11. In the pre-assembly position, the retaining elements 19 are approximately flush with the corresponding sidewall 10 in which the pre-assembly receiving region 11 is formed.

In an assembly position 30, the retaining elements 19 are arranged in the assembly regions 12, wherein their retaining surfaces 21 extend outwardly in a radial direction beyond the corresponding side wall 10 in which the assembly region 12 is formed.

In a final assembly position 31, the retaining elements 19 are arranged with the corresponding retaining surfaces 21 in the region of the screw head receiving region 9 of the housing device 2 in order to fix two components 32, 33 to be connected to one another and thus in order to connect them to one another.

In the following, a method for producing a fastening module as described above will be briefly described. This method includes the following steps:

producing a housing device, preferably by injection molding, producing a nut device, preferably by injection molding, producing a screw device, preferably by injection molding, introducing the nut device into a receiving region of the housing device, and screwing the screw device into the nut device until a screw head of the screw device is rotatably received in a screw head receiving region of the housing device in such a way that a connection between the screw device and the housing device forms a sliding bearing, wherein the screw head is fixedly placed in the axial direction in the screw head receiving region.

Here, a sequence of the production steps plays a subordinate role.

The method is preferably carried out at least partially and preferably entirely in a production plant.

It is provided in this case that the screw device is screwed into the nut in the axial direction to a defined extent or to a predetermined length or predetermined angle of rotation. Then, the screw device and the nut device are inserted or stuck together from above or via the first screw passage in the axial direction into the housing device until a screw jack in the screw head receiving region of the housing device clicks into place.

The screw device is then rotated counterclockwise so that the nut device rotates 90° and touches a stop surface. The screw device is then continuously rotated to a defined extent or a predetermined length or a predetermined angle of rotation until a final pre-assembly position of the nut device is achieved and the nut device is arranged or retained in a pre assembly receiving region.

The pre-assembly process is now complete, and the component is operational and, for example, can be sent as a module to a customer without changing a relative position of the individual components.

Furthermore, according to the present invention, a method for connecting two components to a fastening module as described above is provided. This method includes the following steps:

- preferably, inserting a tool into a drive of a screw device of the fastening module,
- inserting the fastening module, in particular a housing device of the fastening module, into two through-openings of two components to be connected, said openings being arranged in alignment with one another,
- applying a torque to a screw head of the screw device in such a way that the screw head is set into a rotational movement and remains fixed in an axial direction in a screw head receiving region of the housing device, wherein a nut device of the fastening module is first displaced in the axial direction and then transferred from a pre-assembly position into an assembly position by a rotational movement about a longitudinal screw axis, wherein the nut device in the assembly position is then moved in the axial direction until a final assembly position is achieved, in which at least one retaining element of the nut device fixes the two components to be connected between the screw head receiving region of the housing device and the retaining element.

LIST OF REFERENCE NUMERALS

1 Fastening assembly
2 Housing device
3 Nut device
4 Screw device
5 Receiving space
6 Bottom wall
7 First screw through-passage
8 Struts
9 Screw head receiving region
10 Side wall
11 Pre-assembly receiving region
12 Assembly region
13 First stop
14 Second stop
15 Second screw through-passage
16 Axial stop
17 Mounting wall
18 Internal thread
19 Retaining elements
20 Axial direction
21 Retaining surface
22 Screw head
23 Screw shank
24 External thread
25 Mounting section
26 Longitudinal axis
27 Drive
28 Stiffening struts
29 Pre-assembly position
30 Assembly position
31 Final assembly position
32 First component
33 Second component
34 Assembly direction

The invention claimed is:

1. A fastening system, comprising:
a fastening module engaged with first and second plate components, the fastening module including:
a housing device having a screw head receiving region and a nut holding structure with a side wall projecting from the screw head receiving region to a bottom wall, the side wall being disposed about and defining a nut receiving space therewithin, wherein the bottom wall delimits a lower side of the nut receiving space,
a nut device located in the nut receiving space and arranged so as to be displaceable in the nut receiving space, the nut device including a threaded central portion and at least one retaining element projecting radially outward from the threaded central portion;
a screw device connected to the housing device and including a threaded part engaged with the nut device,
wherein the fastening module is engaged with the first and second plate components with the nut holding structure projecting through aligned passages of the first and second plate components;
wherein the nut device is within the nut receiving space in a pre-assembly position relative to the nut holding structure and in which the at least one retaining element of the nut device is positioned within the nut receiving space and in which the nut holding structure is configured such that rotation of the nut device, upon initial rotation of the screw device, is prevented;
wherein a connection between the threaded central portion and the at least one retaining element is located within the nut receiving space.

2. The fastening system according to claim 1, wherein a slope of an external thread of the screw device and a slope of an internal thread of the nut device at least slightly differ from one another, such that a self-inhibition between the threads is present upon transfer of a torque from the screw device to the nut device.

3. The fastening system according to claim 1,
wherein the nut-holding structure is configured such that initial rotation of the screw device causes the nut device to move axially toward the first and second plate components into an axial position in which further rotation of the screw device causes the nut device to rotate into an assembly position relative to the nut holding structure and in which the at least one retaining element extends outward beyond the nut-holding structure.

4. The fastening system according to claim 1, wherein
the nut holding structure is configured to be approximately rectangular in cross-section and the bottom wall is connected to the screw head receiving region via two struts that are diametrically opposed to one another, wherein, in the region of the bottom wall, a pre-assembly receiving region for receiving the at least one retaining element is provided and includes a shoulder, wherein, when the nut device is in the pre-assembly position, the shoulder interacts with the at least one retaining element such that rotation of the nut device, upon initial rotation of the screw device, is prevented, and such that, upon rotation of the screw device, the nut device is axially displaceable in the pre-assembly receiving region, wherein, after a predetermined displacement in the axial direction, the nut device is rotatable into an assembly region of the nut receiving space and the nut device is axially displaceable in the assembly region until a final assembly position is achieved.

5. The fastening system according to claim 4, wherein the pre-assembly receiving region is configured on one side of the housing device in the region of the nut receiving space, and the assembly region is configured on a side of the nut receiving space adjacent to the one side.

6. The fastening system according to claim 1, wherein the screw head receiving region in the region of the screw head comprises a radially circumferential groove with a semi-circular cross-section, wherein a radial outer edge of the screw head rotatably mounted therein is configured correspondingly.

7. The fastening system of claim 1, wherein the screw head receiving region comprises a disk-shaped wall with a mounting wall extending axially at a radially outer edge of the disk-shaped wall, the disk-shaped wall and the mounting wall being molded together.

8. The fastening system of claim 1, wherein a screw head of the screw device is rotatably mounted and received in a screw head receiving region of the housing device, and wherein the screw device is fixedly placed in an axial direction by mounting of the screw head in engagement with a groove of the screw head receiving region that captures a radial outer edge of the screw head on both axial sides of a radially outer edge of the screw head.

9. A method for connecting two plate components to a fastening module, wherein the fastening module includes a housing device with a side wall that is disposed about and defines a nut receiving space therewithin, the housing device having a bottom wall that delimits a lower side of the nut receiving space, a nut device located within the nut receiving space and arranged so as to be displaceable in the nut receiving space, the nut device including a central portion and at least one retaining element located within the nut receiving space and extending from the central portion toward the side wall, and a screw device connected to the housing device in such a way that the fastening module is a pre-assembled assembly with the screw device engaging the nut device and the nut device in a pre-assembly position, the method comprising:
  inserting a tool into a drive of the screw device of the fastening module,
  inserting the housing device of the fastening module, into two passages of the two plate components, said passages being arranged in alignment with one another,
  applying a torque to a screw head of the screw device in such a way that the screw head is set into a rotational movement and remains fixed in an axial direction in a screw head receiving region of the housing device, wherein the nut device, including the at least one nut retaining element, is first displaced within the nut receiving space in the axial direction and then transferred from the pre-assembly position into an assembly position by a rotational movement about a longitudinal screw axis, wherein the nut device in the assembly position is then moved in the axial direction until a final assembly position is achieved, in which the at least one retaining element of the nut device extends outwardly from and beyond the side wall and fixes the two plate components between the screw head receiving region of the housing device and the at least one retaining element.

10. A fastening module for connecting two components, the fastening module comprising:
  a housing device including a screw head receiving region and a nut holding structure projecting from the screw head receiving region and defining a nut receiving space;
  a nut device arranged so as to be displaceable in the nut receiving space, the nut device including a retaining element; and
  a screw device connected to the housing device in such a way that the fastening module is a pre-assembled assembly with the screw device engaging the nut device and the nut device in a pre-assembly position within the nut receiving space;
  wherein the nut holding structure includes a bottom wall spaced from the screw head receiving region and connected to the screw head receiving region via first and second struts that are spaced apart from each other, wherein a pre-assembly receiving region is located in a region between the spaced apart struts and is defined for receiving the retaining element when the nut device is in the pre-assembly position,
  wherein the pre-assembly receiving region includes a shoulder extending from the bottom wall toward the screw head receiving region such that when a torque is applied to rotate the screw device into the nut device the shoulder prevents rotation of the nut device until the nut device moves axially beyond the shoulder, at which point further application of torque to rotate the screw device causes rotation of the nut device into an assembly position relative to the nut receiving space and in which the retaining element extends outwardly beyond the nut holding structure.

* * * * *